United States Patent
Zhang et al.

(10) Patent No.: US 11,548,539 B2
(45) Date of Patent: Jan. 10, 2023

(54) SYSTEMS FOR A BRAKE SYSTEM

(71) Applicant: Transportation IP Holdings, LLC, Norwalk, CT (US)

(72) Inventors: Jingjun Zhang, Erie, PA (US); Bret D. Worden, Union City, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 161 days.

(21) Appl. No.: 15/930,241

(22) Filed: May 12, 2020

(65) Prior Publication Data
US 2021/0354734 A1    Nov. 18, 2021

(51) Int. Cl.
| | |
|---|---|
| *B61H 13/20* | (2006.01) |
| *B61H 13/26* | (2006.01) |
| *B61H 9/00* | (2006.01) |
| *B61H 15/00* | (2006.01) |
| *B61H 13/34* | (2006.01) |

(52) U.S. Cl.
CPC ............. *B61H 13/26* (2013.01); *B61H 9/006* (2013.01); *B61H 13/34* (2013.01); *B61H 15/0085* (2013.01)

(58) Field of Classification Search
CPC ........ B61H 13/26; B61H 13/34; B61H 9/006; B61H 15/0085
USPC .......................................................... 188/46
See application file for complete search history.

(56) References Cited

U.S. PATENT DOCUMENTS

| | | | | |
|---|---|---|---|---|
| 280,244 | A * | 6/1883 | Rice ....................... | B61H 13/26 188/46 |
| 1,160,358 | A * | 11/1915 | Anderson .......... | B61H 15/0085 188/202 |
| 1,201,310 | A * | 10/1916 | Kadel et al. ........... | B61H 13/26 188/46 |
| 1,274,677 | A * | 8/1918 | Burton ................... | B61H 13/26 188/46 |
| 1,769,756 | A * | 7/1930 | Schaefer ................ | B61H 13/34 74/522 |
| 1,949,187 | A * | 2/1934 | Setterwall .............. | B61H 13/32 188/195 |
| 2,149,496 | A * | 3/1939 | Baselt .................... | B61H 13/22 188/46 |
| 2,494,280 | A * | 1/1950 | Baselt .................... | B61H 13/22 188/46 |
| 2,575,825 | A * | 11/1951 | McGowan ............. | B61H 13/22 188/199 |
| 2,717,791 | A * | 9/1955 | Packer ............... | B61H 15/0085 403/20 |
| 2,754,935 | A * | 7/1956 | Tack ...................... | B61H 13/22 188/46 |
| 3,516,696 | A * | 6/1970 | Kaim ................. | B61H 15/0085 403/23 |

* cited by examiner

*Primary Examiner* — Xuan Lan Nguyen
(74) *Attorney, Agent, or Firm* — McCoy Russell LLP

(57) ABSTRACT

Various methods and systems are provided for a braking system. In one example, a braking arrangement comprising a dead lever comprising a protrusion offset toward a live lever and a slack adjuster.

17 Claims, 4 Drawing Sheets

SYSTEMS FOR A BRAKE SYSTEM

BACKGROUND

Technical Field

Embodiments of the subject matter disclosed herein relate to an anti-slide brake rigging.

Discussion of Art

Braking technologies for locomotives may include powered axles and unpowered axles. Powered axles may comprise speed sensors and slide detection sensors to monitor wheel slide on the axles during a braking event. Unpowered axles may be free of speed sensors and slide detection sensors, which may result in undetected or increased wheel slide during certain braking conditions.

Braking performances are regulated via a plurality of government standards including a net brake ratio, a service stopping distance, an emergency stopping distance, and a net parking brake ratio. As such, modifications to various brake rigging parameters are subject to additional requirements.

BRIEF DESCRIPTION

In one embodiment, a braking system for a vehicle truck, comprises a dead lever comprising a protrusion offset toward a live lever and a slack adjuster.

In another embodiment, a rail vehicle truck, comprises a brake rigging arrangement for an unpowered axle of the rail vehicle truck, the brake rigging arrangement including a braking arrangement for an unpowered axle, comprises a dead lever, a slack adjuster, and a live lever, wherein the slack adjuster is coupled to a protrusion opening arranged on a protrusion of the dead lever.

In a further embodiment, a system, comprises a first axle comprising a first brake rigging arrangement, a second axle comprising a second brake rigging arrangement, and a third axle comprising a third brake rigging arrangement, wherein the first brake rigging arrangement and the second brake rigging arrangement comprise a first brake rigging ratio and the third brake rigging arrangement comprises a second brake rigging ratio less than the first brake rigging ratio, wherein a distance measured between an axis of a first dead lever and a first slack adjuster of the first and second brake rigging arrangements is less than a distance measured between an axis of a second dead lever and a second slack adjuster of the third brake rigging arrangement.

BRIEF DESCRIPTION OF THE DRAWINGS

FIGS. 2B, 3, and 4 are shown approximately to scale, however, other relative dimensions may be used if desired.

DETAILED DESCRIPTION

Figure 1:
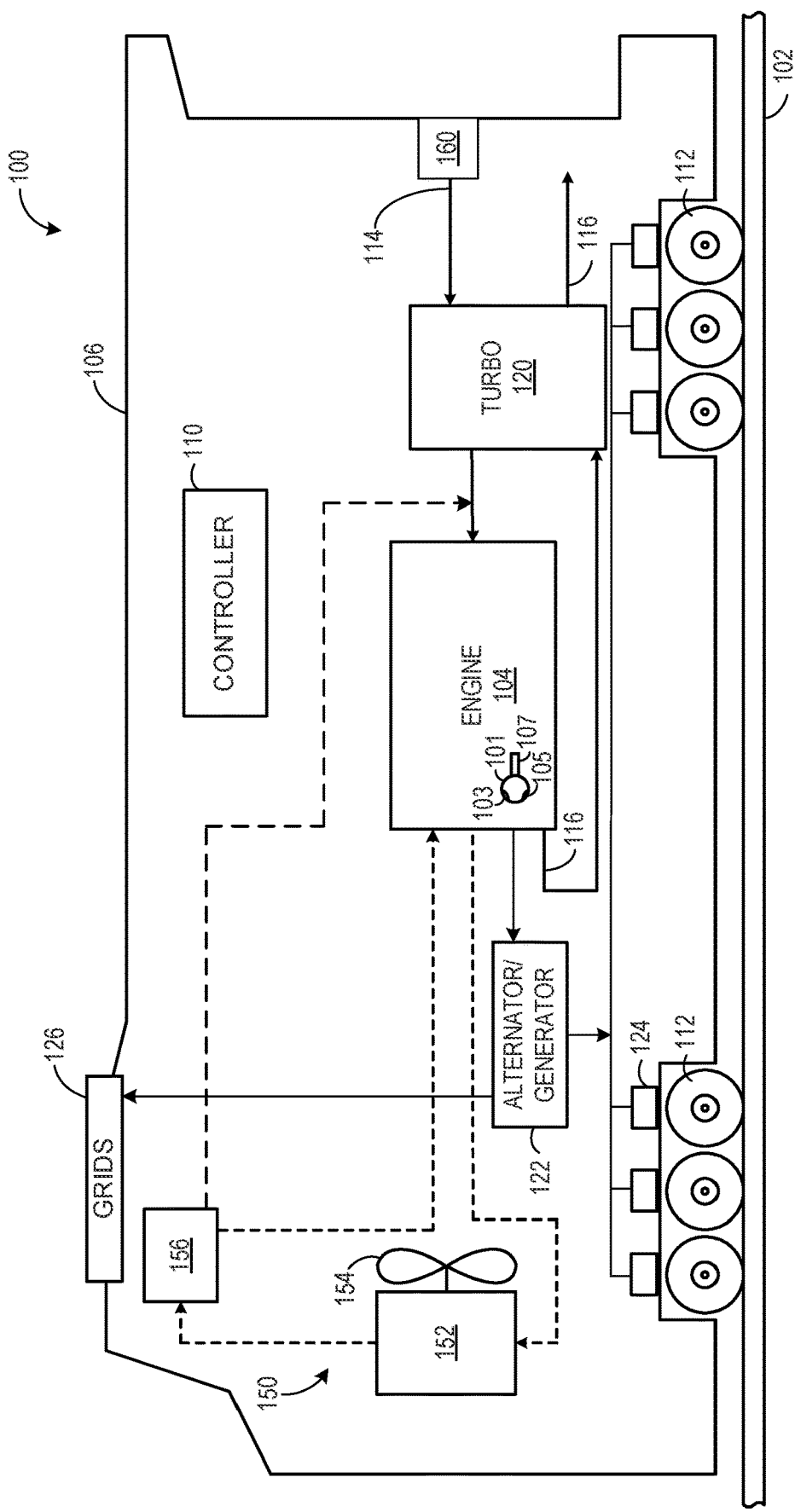
FIG. 1 shows a schematic diagram of a vehicle with an engine comprising a turbocharger arrangement, according to an embodiment of the present disclosure.

The following description relates to embodiments of a brake system for a transportation device. In one example, the brake system is a brake system for an arrangement comprising more than one axle. The transportation device may be locomotive, such as a train or a rail vehicle truck, as illustrated in FIG. 1. However, it will be appreciated that other transportation devices, such as a car, a plane, a commercial truck, or other transportation device may realize the benefits of the modified braking arrangement of the present disclosure.

Figure 2A:
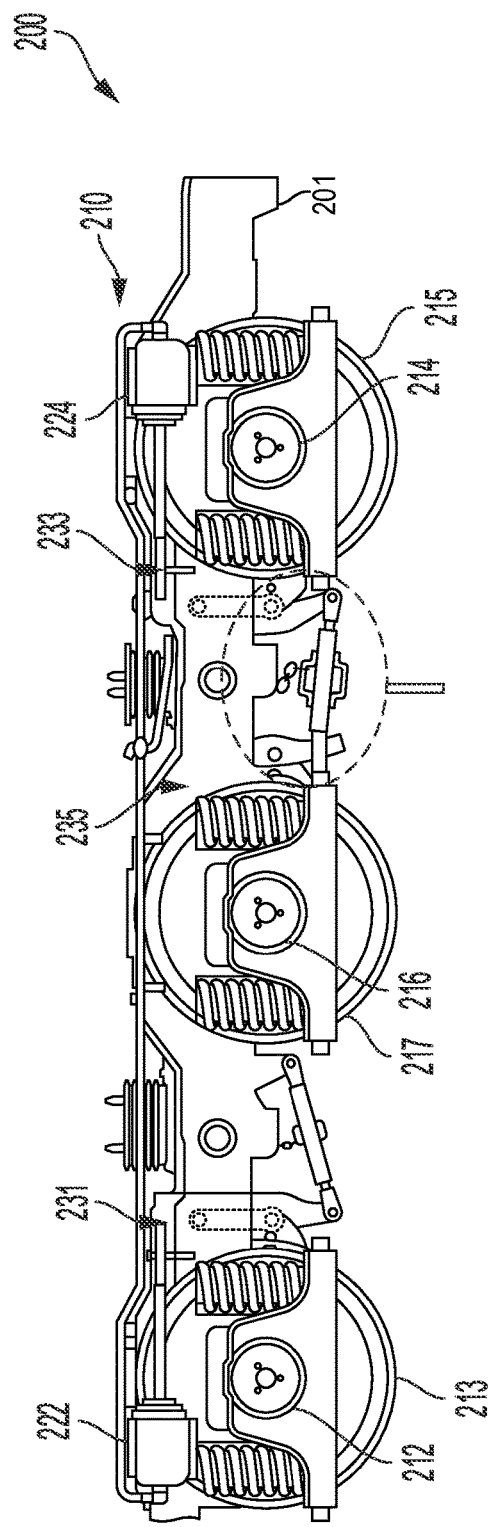
FIG. 2A shows a prior art example of a brake rigging ratio configuration of a braking system.

FIG. 2A illustrates a prior art example of a brake rigging arrangement comprising two powered axles flanking a center axle which is unpowered. In the prior art example, the center axle is lighter than the two other powered axles, but uses the same brake shoes and brake shoe forces as those of the powered axles. The wheels of the center axle may be prone to slipping due to one or more of the lighter center axle load, lack of speed sensors and slide detection sensors, and an inability to control the central axle due to it being unpowered while having the same braking force as the two other powered axles.

Figure 2B:
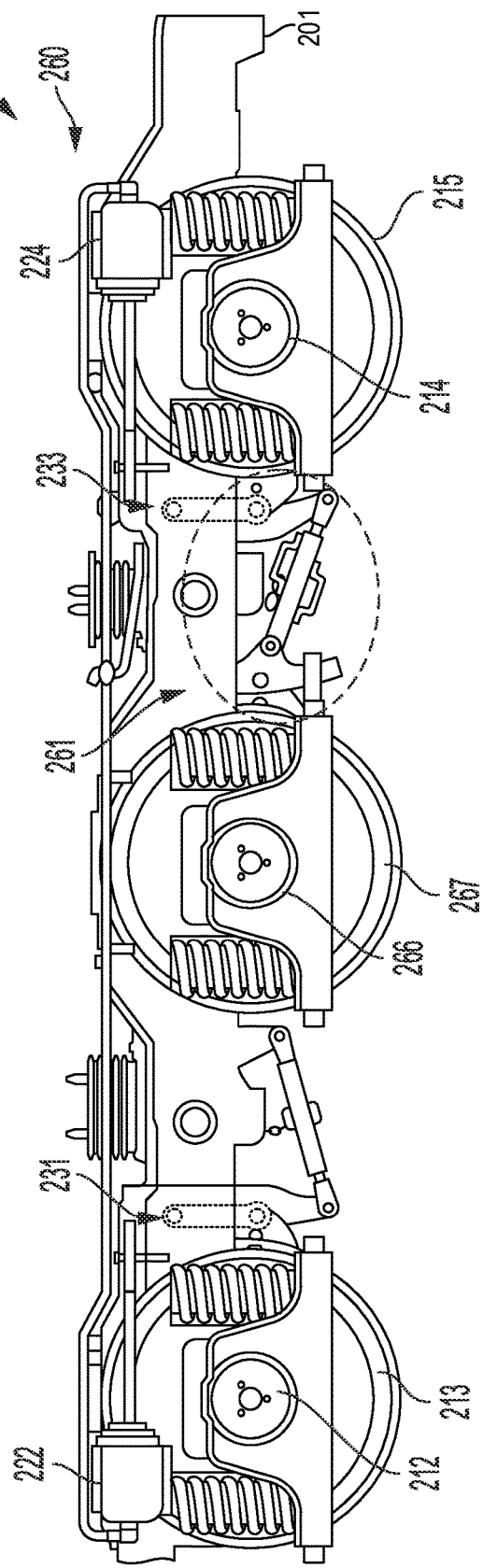
FIG. 2B shows an example of the present disclosure of a brake rigging ratio configuration of a braking system.
Figure 3:
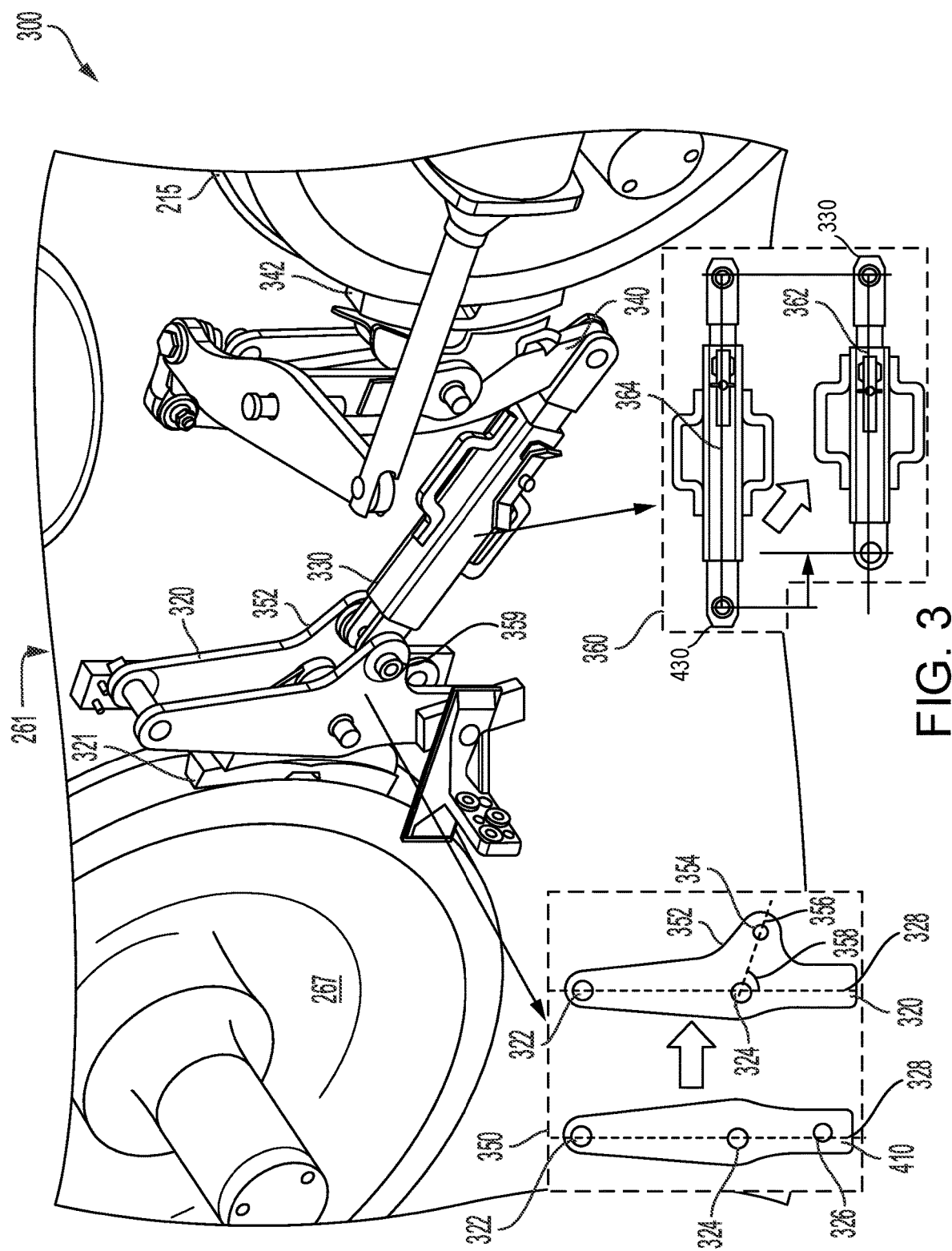
FIG. 3 shows a detailed view of the brake rigging ratio configuration of the present example including adjustments to a dead lever and a slack adjuster.
Figure 4:
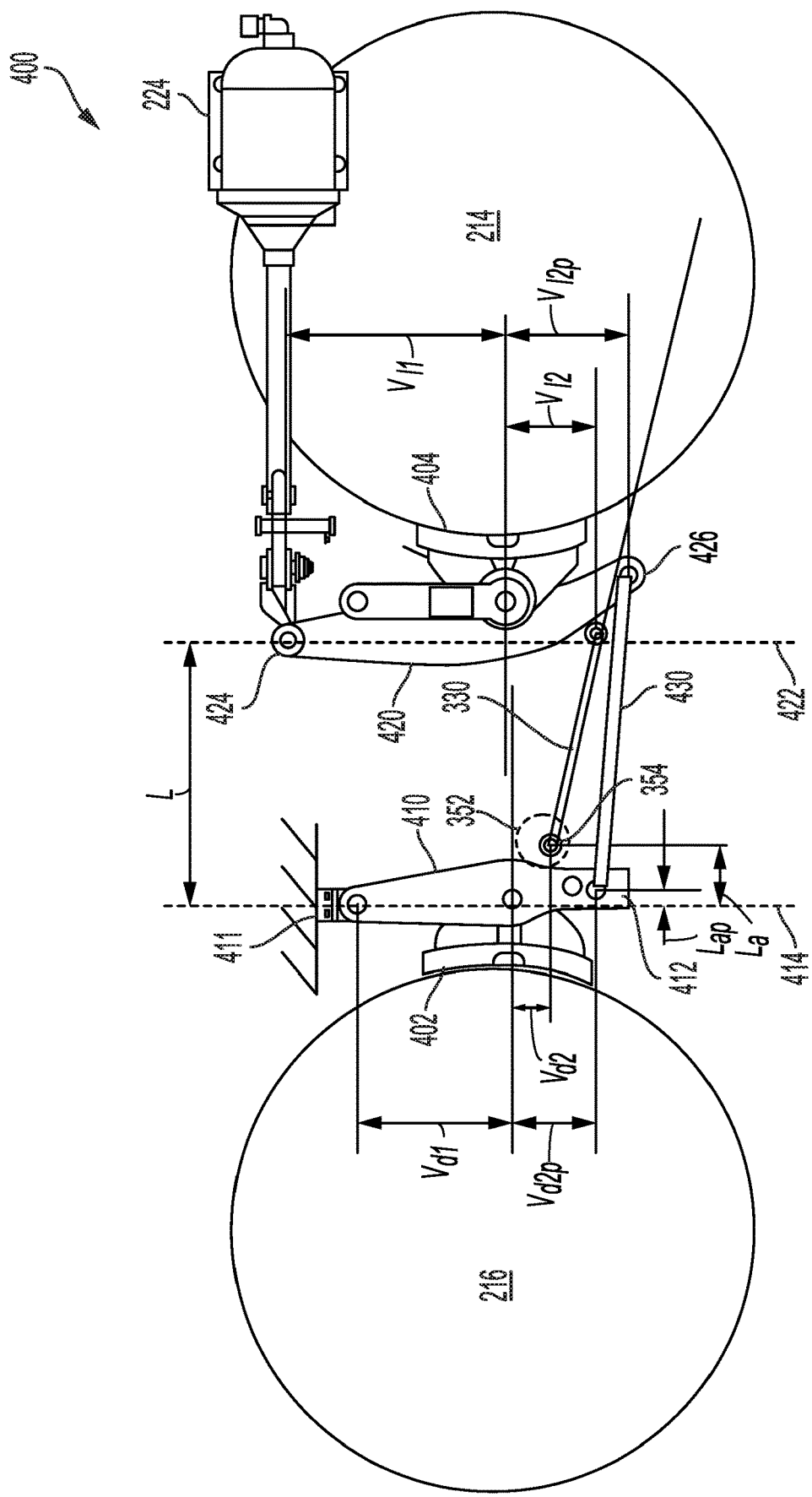
FIG. 4 shows a detailed geometry of the brake system.

FIG. 2B illustrates an embodiment of a brake rigging arrangement of the present disclosure, which at least partially cures some of the deficiencies of the prior art example of FIG. 2A to decrease a likelihood of the center unpowered lighter axle sliding. Therein, a brake rigging ratio of the brake rigging arrangement is adjusted relative to the prior art. In one example, the brake rigging ratio of the center axle is reduced, which results in a reduced brake force and a lower likelihood of slipping between a rail and a wheel of the unpowered axle. A more detailed view of a brake rigging arrangement of the center axle is illustrated in FIG. 3 along with modification details to the dead lever and slack adjuster to provide the benefits of the present disclosure while maintaining the lighter center axle unpowered. FIG. 4 illustrates detailed geometries of the center axle brake rigging arrangement.

The approach described herein may be employed in a variety of vehicle types which may include powered and unpowered axles, as well as axles with unevenly distributed axle loads. The powered axles may include sensors and other devices for tracking slip and other conditions of the powered axles. The unpowered axles may be free of sensors and other devices wherein wheels thereof may not be directly tracked. For clarity of illustration, a locomotive is provided as an example of a mobile platform supporting a system incorporating an embodiment of the disclosure.

FIGS. 1, 2A, 2B, 3 and 4, show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 1 shows an embodiment of a system in which a turbocharger arrangement may be installed. Specifically, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine 104. The engine includes a plurality of cylinders 101 (only one representative cylinder shown in FIG. 1) that each include at least one intake valve 103, exhaust valve 105, and fuel injector 107. Each intake valve, exhaust valve, and fuel injector may include an actuator that may be actuated via a signal from a controller 110 of the engine 104. In other non-limiting embodiments, the engine 104 may be a stationary engine, such as in a power-plant application, or an engine in a marine vessel or other off-highway vehicle propulsion system as noted above.

The engine receives intake air for combustion from an intake passage 114. The intake passage comprises an air filter 160 that filters air from outside of the rail vehicle. Exhaust gas resulting from combustion in the engine is supplied to an exhaust passage 116. Exhaust gas flows through the exhaust passage, and out of an exhaust stack of the rail vehicle. In one example, the engine is a diesel engine that combusts air and diesel fuel through compression ignition. In another example, the engine is a dual or multi-fuel engine that may combust a mixture of gaseous fuel and air upon injection of diesel fuel during compression of the air-gaseous fuel mix. In other non-limiting embodiments, the engine may additionally combust fuel including gasoline, kerosene, natural gas, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 122 and electric traction motors 124. For example, the engine is a diesel and/or natural gas engine that generates a torque output that is transmitted to the alternator/generator which is mechanically coupled to the engine. In one embodiment herein, the engine is a multi-fuel engine operating with diesel fuel and natural gas, but in other examples the engine may use various combinations of fuels other than diesel and natural gas.

The alternator/generator 122 produces electrical power that may be stored and applied for subsequent propagation to a variety of downstream electrical components. As an example, the alternator/generator 122 may be electrically coupled to a plurality of traction motors and the alternator/generator may provide electrical power to the plurality of traction motors. As depicted, each of the plurality of traction motors is connected to one of the plurality of wheels to provide tractive power to propel the rail vehicle. One example configuration includes one traction motor per wheel set. As depicted herein, six traction motors correspond to each of six pairs of motive wheels of the rail vehicle. In another example, alternator/generator may be coupled to one or more resistive grids 126. The resistive grids may be configured to dissipate excess engine torque via heat produced by the grids from electricity generated by alternator/generator.

In some embodiments, the vehicle system may include a turbocharger 120 that is arranged between the intake passage and the exhaust passage. The turbocharger increases air charge of ambient air drawn into the intake passage in order to provide greater charge density during combustion to increase power output and/or engine-operating efficiency. The turbocharger may include at least one compressor (not shown) which is at least partially driven by at least one corresponding turbine (not shown). In some embodiments, the vehicle system may further include an aftertreatment system coupled in the exhaust passage upstream and/or downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or exhaust aftertreatment systems.

As depicted in FIG. 1, the vehicle system further includes a cooling system 150 (e.g., engine cooling system). The cooling system circulates coolant through the engine to absorb waste engine heat and distribute the heated coolant to a heat exchanger, such as a radiator 152 (e.g., radiator heat exchanger). In one example, the coolant may be water. A fan 154 may be coupled to the radiator in order to maintain an airflow through the radiator when the vehicle is moving slowly or stopped while the engine is running. In some examples, fan speed may be controlled by the controller. Coolant which is cooled by the radiator may enter a tank (not shown). The coolant may then be pumped by a water, or coolant, pump 156 back to the engine or to another component of the vehicle system.

The controller 110 may be configured to control various components related to the rail vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of rail vehicle operation. In some examples, the controller may include more than one controller each in communication with one another, such as a first controller to control the engine and a second controller to control other operating parameters of the locomotive (such as tractive motor load, blower speed, etc.). The first controller may be configured to control various actuators based on output received from the second controller and/or the second controller may be configured to control various actuators based on output received from the first controller.

The controller may receive information from a plurality of sensors and may send control signals to a plurality of actuators. The controller, while overseeing control and management of the engine and/or rail vehicle, may be configured to receive signals from a variety of engine sensors, as further elaborated herein, in order to determine operating parameters and operating conditions, and correspondingly adjust various engine actuators to control operation of the engine and/or rail vehicle. For example, the engine controller may receive signals from various engine sensors including, but not limited to, engine speed, engine load, intake manifold air pressure, boost pressure, exhaust pressure, ambient pressure, ambient temperature, exhaust temperature, particulate filter temperature, particulate filter back pressure, engine coolant pressure, or the like. Additional sensors, such as coolant temperature sensors, may be positioned in the cooling system. Correspondingly, the controller may control the engine and/or the rail vehicle by sending commands to various components such as the traction motors, the alternator/generator, fuel injectors, valves (e.g., coolant and/or EGR cooler valve), coolant pump, or the like. For example, the controller may control the operation of a restrictive element (e.g., such as a valve) in the engine cooling system. Other actuators may be coupled to various locations in the rail vehicle.

Turning now to FIG. 2A, it shows an embodiment 200 of a prior art example of a brake rigging arrangement 210. In one example, the brake rigging arrangement 210 is a C4 locomotive. In one example, a C4 locomotive is a six axle locomotive with four powered axles and two unpowered axles. The truck brake rigging arrangement of FIG. 2A, comprises where a first axle 212 is a powered axle, a second axle 214 is also a powered axle, and a third axle 216 is an unpowered axle. The powered axles may differ from the unpowered axle in that the powered axles are heavier, and comprise a speed sensor and slide detection. As such, when a first wheel 213 of the first axle 212 and/or a second wheel 215 of the second axle 214 is/are sliding, adjustments may be executed to reduce and/or stop the sliding. A third wheel 217 of the third axle 216 may be more likely to slide during a braking event due to its light weight. However, adjustments to operation of a third wheel 217 of the unpowered, third axle 216 may not be executed since it is free of a motor and slide detection.

One disadvantage to sliding may include an increased likelihood of degradation to one or more of a wheel, including a wheel shell, flatspots (e.g., flattening of a surface of the wheel), and the like. Such wheel defects may cause degradation to a railway and locomotive components, interrupting railway operation. As such, it may be desired to modify the brake rigging arrangement of the prior art to maintain the unpowered configuration of the third axle 216 while decreasing wheel sliding.

The brake rigging arrangement 210 comprises a first brake cylinder 222 and a second brake cylinder 224, wherein the first brake cylinder 222 controls braking of a first brake rigging arrangement 231 of the first axle 212 and the second brake cylinder 224 controls braking of a second brake rigging arrangement 233 of the second axle 214 and a third brake rigging arrangement 235 of the third axle 216. The brake rigging arrangement 231, 233, and 235 comprise a substantially identical brake rigging ratio.

In one example, the powered axles comprise only the live vertical levers which may be coupled to a hanger physically coupled to the frame 201. The first brake cylinder 222 may provide a first braking force in a first direction, resulting in a first brake shoe force applied to the first wheel of the first axle. The second brake cylinder 224 may provide a second braking force in a second direction, opposite the first direction, resulting in a second brake shoe force applied to the second wheel of the second axle. The first braking force may be substantially identical to the second braking force and the first brake shoe force may be substantially identical to the second brake shoe force. As such and as described above, the lever ratio, which is based on a ratio of the brake shoe force and the braking force, is identical for the first axle 212 and the second axle 214.

In the example of the prior art, a third braking force and a third brake shoe force of the third axle is substantially identical to the first and second braking forces and brake shoe force. As such, the brake rigging ratio of the third axle is substantially identical to the brake rigging ratios of the first and second axles.

The third axle comprises a dead vertical lever which applies a brake shoe force based on the second braking force. As described below, the brake rigging ratio may be adjusted via adjusting lengths of the levers and distances to their pivot points in the brake rigging.

A brake rigging ratio may be based on at least but not limited to dimensions of one or more of a dead lever, a slack adjuster, and a live lever. In the example of the present disclosure, illustrated in FIGS. 2B, 3, and 4, the brake force applied to a third wheel 267 of a third axle 266 is reduced relative to the previous example via decreasing the brake rigging ratio while still meeting various braking requirements. FIG. 4 illustrates an example of a lever configuration wherein a plurality of factors may affect the brake rigging ratio. More specifically, FIG. 4 illustrates a direct comparison of the prior art second and third brake rigging arrangements 233 and 235 against a current example of a third brake rigging arrangement (e.g., third brake rigging arrangement 261 of FIG. 2B) used in conjunction with the second brake rigging arrangement 233. $V_{d1}$ corresponds to a distance between a center of a first brake shoe 402 and a first extreme end 411 of a dead vertical lever 410. $V_{d2}$ corresponds to a distance between the center of the first brake shoe 402 and the center of the opening 354 of protrusion 352 comprising a second extreme end 412 of the dead vertical lever 410. As shown in FIG. 4 and in view of the comparison view 350 illustrated in FIG. 3, $V_{d2p}$ is different than $V_{d2}$ insofar as $V_{d2p}$ corresponds to a distance between the center of the first brake shoe 402 and the center of the opening 326 comprising the second extreme end 412 of the dead vertical lever 410 in the example of the prior art. L measures a distance between a center axis 414 of the dead vertical lever 410 and a center axis 422 of the live vertical lever 420. As illustrated, the dead vertical lever 410 is proximal to the third axle 216 and distal to the second axle 214 while the live vertical lever 420 is proximal to the second axle 214 and distal to the third axle 216. $L_{ap}$ measures a horizontal distance between the center axis 414 and a point at which a slack adjuster 430 is physically coupled to the dead vertical lever 410 in the prior art. $L_a$ measures the horizontal distance between the center axis 414 and a point at which the slack adjuster 330 is physically coupled to the protrusion 352 of the dead vertical lever 320. $V_{l1}$ measures a vertical distance between a center of a second brake shoe 404 and a first extreme end 424 of the live vertical lever 420. $V_{l2}$ measures a vertical distance between the center of the second brake shoe 404 and a second extreme end 426 of the live vertical lever 420. Herein, the dead vertical lever 410, the live vertical lever 420, and the slack adjuster 430 are interchangeably referred to as a first dead vertical lever 410, a first live vertical lever 420, and a first slack adjuster 430.

Returning to FIG. 2A, the brake rigging ratio of the third axle is 2.83 as described above, which includes the following values: $V_{d1}$=12.83 in, $V_{d2}$=6.93 in, $V_{l1}$=18.12 in, and $V_{l2}$=10.46 in.

Turning to FIG. 2B, it shows an embodiment 250 of a present example of a brake rigging arrangement 260. The brake rigging arrangement 260 may comprise portions similar to the portions of the brake rigging arrangement 210 of the prior art including the first axle 212, the second axle 214, the first brake cylinder 222, and the second brake cylinder 224. The brake rigging arrangement 260 further comprises a third axle 266 arranged between the first axle 212 and the second axle 214. The third axle 266 is unpowered, similar to the third axle 216 of FIG. 2A and comprises a third wheel 267. As such, the brake rigging arrangement 260 of the present example comprises three axles, with two powered axles sandwiching a third, unpowered axle.

While the embodiments of FIGS. 2A and 2B both illustrate the unpowered third axle arranged between the powered first and second axles, it will be appreciated that the unpowered axle may be arranged as an end axle without departing from the scope of the present disclosure. That is to say, the advantages of the present disclosure may also be applied to arrangements where the unpowered axle is arranged adjacent to only one of the powered axles.

The brake rigging arrangement 260 differs from the brake rigging arrangement 210 in that a brake rigging ratio of the third axle 266 is less than the brake rigging ratio of the third axle 216 of FIG. 2A. In one example, the brake rigging ratio of a third brake rigging arrangement 261 of the third axle 266 is less than 2.5. In some examples, additionally or alternatively, the brake rigging ratio of the third axle 266 is less than 2.3. In some examples, additionally or alternatively, the brake rigging ratio of the third axle 266 is less than 2.0. In some examples, additionally or alternatively, the brake rigging ratio of the third axle 266 is less than 1.8. In one example, the brake rigging ratio of the third axle 266 is 1.76.

In one example, a system of the present disclosure, comprises a first brake rigging arrangement for a first, powered axle and a second brake rigging arrangement for a second, powered axle, wherein the first brake rigging arrangement and the second brake rigging arrangement comprise a first brake rigging ratio greater than 2.5, and a third brake rigging arrangement for a third, unpowered axle, wherein the third brake rigging arrangement comprises a second brake rigging ratio less than 2.0.

The third brake rigging arrangement 261 is arranged between the first brake rigging arrangement and the second brake rigging arrangement. The first brake rigging arrangement and the second brake rigging arrangement each comprise a live vertical lever, wherein the third brake rigging arrangement comprises a dead vertical lever. Each of the live vertical lever and the dead vertical lever comprise an upper opening, a middle opening, and a lower opening. However, the lower opening of the dead vertical lever is arranged on a protrusion and may be interchangeably referred to as a protrusion opening. In one example, the lower opening of the dead vertical lever is vertically higher than the lower opening of the live vertical levers of the present example.

In one example, the upper opening and the middle opening are aligned along a first axis for each of the live vertical levers and the dead vertical lever. The lower opening of the live vertical levers may be offset to the first axis or in line with the first axis. Additionally or alternatively, if the lower opening is offset to the first axis, a second axis extending from the middle opening to the lower opening may comprise a first angle, wherein the first angle is between 1 and 20 degrees.

The protrusion opening of the dead vertical lever is aligned with the middle opening of the dead vertical lever along a second axis, wherein the second axis is angled to the first axis by a second angle between 5 and 90 degrees. In one example, the second angle is greater than the first angle. As described above, the protrusion opening is vertically higher than the lower opening of the live vertical levers, this along with the shortened length of the slack adjuster may result in a lower brake rigging ratio of the third brake rigging arrangement.

The first brake rigging arrangement comprises a first slack adjuster, and wherein the second and the third brake rigging arrangement comprises a second slack adjuster different than the first slack adjuster. The first slack adjuster comprises a first length which may have same or different length of a second length of the second slack adjuster. The first brake rigging arrangement and the second brake rigging arrangement comprise a hanger, and wherein the third brake rigging arrangement does not have a hanger.

Turning to FIG. 3, it shows a detailed view 300 of the third brake rigging arrangement 261 of the brake rigging arrangement 260 of FIG. 2B. Specifically, the third brake rigging arrangement 261 comprises a dead vertical lever 320, a slack adjuster 330, and a live lever 340. The dead vertical lever 320 comprises a first brake shoe 321 in physical contact with the third wheel 267. As such, the first brake shoe 321 is configured to slow a rotation of the third wheel 267. The live vertical lever 340 comprises a second brake shoe 342 in physical contact with the second wheel 215. The second brake shoe 342 is configured to slow a rotation of the second wheel 215.

In one example, the dead vertical lever 320 and the slack adjuster 330 are interchangeably referred to as a second dead vertical lever 320 and a second slack adjuster 330. The second dead vertical lever 320 and the second slack adjuster 330 are different in size and shape relative to the first dead vertical lever 410 and the first slack adjuster 430 of FIG. 4. Differences of the size and shape of the second dead vertical lever 320 and slack adjuster 330 relative to the first dead vertical lever 410 and slack adjuster 430 of the prior art are described in greater detail herein.

To reduce the brake rigging ratio of the third brake rigging arrangement 261, dimensions of the dead vertical lever 320 and the slack adjuster 330 are modified while dimensions and a shape of the live lever 340 are maintained. In one example, the live lever 340 is identical to the live lever 420 of FIG. 4. A previous example of the first dead lever 410 is illustrated in a comparison view 350 next to the current example of the second dead lever 320. As illustrated, both levers comprise an upper opening 322 and a middle opening 324. The upper opening 322 and the middle opening 324 may be aligned along a first axis 328. The lower opening 326 of the first dead vertical lever 410 may be misaligned with the first axis 328, wherein the lower opening 326 may be biased away from the third wheel 267 relative to the upper opening 322 and the middle opening 324. That is to say, as shown in the comparison view 350 depicted in FIG. 3, a geometric center of the lower opening 326 may be misaligned with the first axis 328 so as to be biased away from the third wheel relative to the first axis 328. However, in some examples, the lower opening 326 may be aligned with the first axis 328. A first angle may be formed between an axis extending from geometric centers of the middle opening 324 and the lower opening 326 of the first dead vertical lever 410 and the first axis 328. In one example, the first angle is less than 10 degrees.

The dead vertical lever 320 comprises a protrusion 352 extending from a side of the dead vertical lever 320 in a direction toward the live lever 340. The protrusion 352 comprises an opening 354, interchangeably referred to as a protrusion opening, which is aligned with the middle opening 324 along a second axis 356 such that the second axis 356 passes through geometric centers of the middle opening 324 and the protrusion opening 354. The second axis 356 is angled to the first axis by an angle 358 (e.g., a second angle, which is larger than the first angle). The angle 358 is between 5 and 90 degrees. In some examples, additionally or alternatively, the angle 358 is between 40 and 80 degrees. In some examples, additionally or alternatively, the angle 358 is between 60 and 80 degrees. In some examples, additionally or alternatively, the angle 358 is between 65 and 75 degrees. In one example, the angle 358 is 73.3 degrees. The geometric center of the protrusion opening 354 is lower than the middle opening 324. In one example, the protrusion opening 354 is between 1-5 inches lower than the middle opening 324. In some examples, the protrusion opening 354 is between 1-3 inches lower than the middle opening 324. In one example, the protrusion opening 354 is 1.26 inches lower than the middle opening 324.

As a result of the shape of the dead vertical lever 320, the second slack adjuster 330 may be adjusted relative to the first slack adjuster 430 of the prior art. A comparison 360 illustrates a comparison of the first slack adjuster 430 of the prior art example relative to the second slack adjuster 330 of the present disclosure. The slack adjuster 330 may comprise a length 362 which is less than a length 364 of the slack adjuster 430 of the prior art. In one example, the length 364 is about 26 inches and the length 362 is about 23.5 inches. The length 362 of the slack adjuster 330 may be reduced via addition of the protrusion 352 to the dead vertical lever 320.

The second slack adjuster 330 may be physically coupled to the protrusion 352 of the dead vertical lever 320 via a fastener 359 extending through the opening 354. In one example, the opening 354 is a pair of openings aligned along an axis normal to the first axis 328 and the second axis 356. The fastener 359 may extend through a first opening of the pair of openings, through the slack adjuster 330, and through the second openings of the pair of openings before being received by a nut or other similar device. By doing this, the slack adjuster 330 is physically coupled to a portion of the dead vertical lever 320 proximal to the middle opening 324. This reduces the $V_{d2}$ value of the lever arrangement of the example of the present disclosure relative to the prior art, which reduces its brake rigging ratio. That is to say, the brake rigging ratio may be reduced to a ratio less than 2.0 without adjusting a shape and/or arrangement of the live lever 340 and components contacting the second wheel 214. More specifically, $V_{d2}$ may be equal to 1.26 inches. Additionally, the brake rigging ratio is adjusted via an increase in the $L_d$ value also due to the inclusion of the protrusion. The $L_d$ value may increase to 4.21 inches. In one example, adjusting the dimensions and shape of the second dead vertical lever 320 and the second slack adjuster 330, a braking force of the third axle 360 is lower compared to a braking force of the first and second axles during an air brake event, which uses the brake cylinders of FIGS. 2A and 2B. As such, the lower brake rigging ratio of the third axle may result in a lower adhesion requirement than the end axles (e.g., the first axle and the second axle) during air braking. This may result in a lower likelihood of slipping, which may increase a longevity of the third axle and its wheels while maintaining the third axle unpowered.

By adjusting the brake rigging ratio via only adjusting configurations of the dead vertical lever 320 and the slack adjuster 330 and not adjusting the configuration of the live lever 340, the brake rigging arrangement of the present disclosure may still meet one or more standards. For example, an adhesion requirement, independent net brake ratio, automatic net brake ratio, service stopping distance, emergency stopping distance, and net parking brake ratio are all met.

In one example, a braking system of a vehicle system comprises power and unpowered axles. In one example, the braking system comprises two powered axles and an unpowered axle. The unpowered axle may be arranged between the two powered axles. Additionally or alternatively, the two powered axles may be arranged adjacent to one another and the unpowered axle may be arranged adjacent to only one of the two powered axles.

Each of the axles may comprise a brake rigging arrangement optionally comprising one or more a live vertical lever, a dead vertical lever, and a slack adjuster. A brake rigging ratio may be based on at least a length of the live vertical lever, the dead vertical lever, and the slack adjuster, along with a brake force and the like. In one example, the brake rigging ratio of the unpowered axle may be reduced by reconfiguring a lever ratio of a dead vertical lever or a live vertical lever associated with the unpowered axle so that a brake shoe force of the unpowered axle is reduced. The brake rigging ratio of the unpowered axle is reduced in such a way that an adhesion requirement of the unpowered axle is lower than the powered axle and the unpowered axle is less likely to slide than the powered axle. As such, the sensors and the controls of the power axles can detect a sliding of the wheels of the powered axles, which is likely to occur prior to a slipping of the unpowered axle.

In this way, a transportation device, such as a locomotive, may comprise a C4 arrangement wherein end axles are powered and a middle axle is unpowered while a likelihood of slip in all of the axles is desirably controlled. Speed sensors and traction control may be available for the powered end axles while the middle axle comprises a lower brake rigging ratio relative to the end axles, wherein the lower brake rigging ratio decreases a braking force of the middle axle. The technical effect of decreasing the brake rigging ratio is to decrease a braking force applied thereto, which may decrease a likelihood of a wheel of the third axle slipping. The reduction of the brake force of the third axle is designed such a way that its adhesion requirement may be lower enough than the powered axles so that the unpowered axle is less likely to slide than the powered axles. As such, the speed sensors and the anti-slide sensors of the powered axles may detect the sliding of the powered axles before the unpowered axle slides. Therefore, an amount of slip or a number of incidences of slip in of the wheel of the third axle may be reduced without using speed sensors and/or traction control. In this way, a packaging size and manufacturing cost may be reduced.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A braking system for a vehicle truck, comprising:
a dead vertical lever comprising a protrusion extending toward a live vertical lever and a slack adjuster of the braking system, wherein a protrusion opening is positioned on the protrusion, wherein the slack adjuster is coupled to the dead vertical lever via the protrusion opening, wherein the dead vertical lever is adapted to apply a first brake shoe force on a first wheel of the vehicle truck, wherein the live vertical lever is adapted to apply a second brake shoe force on a second wheel of the vehicle truck, wherein the dead vertical lever and the live vertical lever are interconnected with one another via the slack adjuster such that the first brake shoe force is applied on the first wheel of the vehicle truck when the second brake shoe force is applied on the second wheel of the vehicle truck via the live vertical lever, and wherein, due to the slack adjuster being coupled to the dead vertical lever at the protrusion opening, the first brake shoe force applied to the first wheel of the vehicle truck is less than the second brake shoe force applied to the second wheel of the vehicle.

2. The braking system of claim 1, wherein the dead vertical lever is arranged on an unpowered axle free of a speed sensor.

3. The braking system of claim 2, wherein the unpowered axle is arranged between two powered axles wherein at least one of the two powered axles comprises the speed sensor.

4. The braking system of claim 1, wherein the dead vertical lever comprises a plurality of openings including an upper opening, a middle opening, and the protrusion opening.

5. The braking system of claim 4, wherein the slack adjuster is coupled to the protrusion opening and the live vertical lever.

6. The braking system of claim 4, wherein a first axis passes through geometric centers of the upper opening and the middle opening, and wherein a second axis, which is oriented at an angle relative to the first axis, extends through geometric centers of the middle opening and the protrusion opening.

7. The braking system of claim 6, wherein the angle is between 40 and 80 degrees.

8. The braking system of claim 1, wherein the live vertical lever is free of a protrusion and wherein the dead vertical lever is arranged on an unpowered axle free of a slide detection device.

9. A rail vehicle truck, comprising:
a brake rigging arrangement for an unpowered axle of the rail vehicle truck, the brake rigging arrangement including:
a dead vertical lever, a slack adjuster, and a live vertical lever, wherein the slack adjuster is coupled to a protrusion opening arranged on a protrusion of the dead vertical lever extending toward the live vertical lever and the slack adjuster, wherein the dead vertical lever is adapted to apply a first brake shoe force on a first wheel of the vehicle truck, wherein the live vertical lever is adapted to apply a second brake shoe force on a second wheel of the vehicle truck, wherein the dead vertical lever and the live vertical lever are interconnected with one another via the slack adjuster such that the first brake shoe force is applied on the first wheel of the vehicle truck when the second brake shoe force is applied on the second wheel of the vehicle truck via the live vertical lever, and wherein, due to the slack adjuster being coupled to the dead vertical lever at the protrusion opening, the first brake shoe force applied to the first wheel of the vehicle truck is less than the second brake shoe force applied to the second wheel of the vehicle.

10. The truck of claim 9, wherein the dead vertical lever comprises an upper opening aligned with a middle opening about a first axis, wherein the middle opening is arranged in a vertical position between the upper opening and the protrusion opening.

11. The truck of claim 10, wherein the protrusion opening is aligned with the middle opening about a second axis, wherein the second axis is angled to the first axis.

12. The truck of claim 11, wherein the slack adjuster is aligned with the second axis.

13. The truck of claim 10, wherein the protrusion of the dead vertical lever extends from a vertical position of the dead vertical lever below the middle opening, wherein the protrusion extends toward the live vertical lever.

14. The truck of claim 10, wherein the slack adjuster is coupled to the protrusion at its first extreme end, and wherein the slack adjuster is coupled to the live vertical lever at its second extreme end opposite the first extreme end.

15. A brake rigging system, comprising:
a first axle comprising a first brake rigging arrangement, wherein the first brake rigging arrangement includes a first slack adjuster coupled to a first live vertical lever, wherein the first live vertical lever is adapted to apply a first brake shoe force on a first wheel of the first axle;
a second axle comprising a second brake rigging arrangement; and
a third axle comprising a third brake rigging arrangement, wherein the second brake rigging arrangement and the third brake rigging arrangement comprise a second slack adjuster coupled to a first dead vertical lever and a second live vertical lever, wherein the second slack adjuster is coupled to a protrusion opening arranged on a protrusion of the dead vertical lever extending toward the second live vertical lever and the second slack adjuster, wherein the second live vertical lever is adapted to apply a second brake shoe force on a second wheel of the second axle, wherein the dead vertical lever is adapted to apply a third brake shoe force on a third wheel of the third axle, wherein the dead vertical lever and the second live vertical lever are interconnected with one another via the second slack adjuster such that the third brake force is applied on the third wheel of the third axle when the second brake force is applied on the second wheel of the second axle via the second live vertical lever, and wherein, due to the second slack adjuster being coupled to the dead vertical lever at the protrusion opening, the third brake shoe force applied to the third wheel of the third axle is less than the second brake shoe force applied to the second wheel of the second axle.

16. The system of claim 15, wherein a first slack adjuster length of the first slack adjuster is greater than a second slack adjuster length of the second slack adjuster.

17. The system of claim 15, wherein the first axle and the second axle are powered and the third axle is unpowered, wherein the third axle is free of a speed detection device and a slide detection device.

* * * * *